Patented May 18, 1937

2,080,696

UNITED STATES PATENT OFFICE 2,080,696

PROCESS FOR PRODUCING PETROLEUM PLASTICS

Donald E. Carr, Naples, Calif., assignor to Union Oil Company of California, Los Angeles, Calif., a corporation of California No Drawing. Application November 20, 1933, Serial No. 698,875

9 Claims. (Cl. 196—22)

This invention relates to a process for producing petroleum plastics, particularly pale binders, that is, light colored or substantially colorless asphalts.

Pale binders, light colored or colorless asphalts, may be considered to comprise asphaltic materials or plastics having, in general, properties similar to ordinary asphalt but which are more transparent or translucent than ordinary asphalt and which are useful for many purposes which ordinary asphalt cannot be used because of its dark color. Pale binders are usually substantially free from dark bodies which are ordinarily present in the usual types of asphalt such as may be produced by steam or air blowing asphaltic oils. Such light colored and transparent plastics may be readily colored with suitable dyes to produce colored asphalts or they may be employed as roof coatings in conjunction with colored pigments or stone, or they may be employed as binding materials for aggregate in sidewalks or walkways, or as a waterproofing coating for fabrics and the like, or they may be used in the same manner as resins in the production of paints and lacquers, or they may be used wherever the special properties of adhesiveness or cementing ability are required of an asphaltic or plastic material in conjunction with freedom of dark colors.

It has been proposed to produce pale binders or substantially colorless asphalts from asphaltic oils or residues by first separating the major portion of the asphalt or solid bitumen from the asphaltic oil by means of an asphalt or bitumen precipitating agent, such as liquid propane or other liquefied normally gaseous hydrocarbon solvents. The propane oil solution is decanted from the precipitated asphalt and distilled to remove first the propane and then to separate the oil into an overhead fraction and a residual fraction containing the remaining asphaltic, gummy or plastic material. The residual fraction is then re-extracted with another or the same asphalt precipitating agent, such as the liquid propane heretofore mentioned, to separate the remaining asphaltic, gummy or plastic materials from the residue, leaving a very heavy viscous oil. The fraction recovered as an insoluble residue by retreating the distillation bottoms subsequent to the removal of the major portion of the asphalt with liquid propane or other asphalt precipitating solvent comprises a pale binder or petroleum plastic.

Pale binders produced in this way, however, have been found to possess certain disadvantages. They are not sufficiently light in color to meet market requirements and are very unstable to light and weathering which makes them undesirable as binders in paint products and the like. In order to improve the pale binders with regard to color and stability against light and weathering, it has been proposed to treat the pale binders with concentrated sulphuric acid of approximately 98% strength. However, this has not been very successful as will be observed hereinafter.

It is, therefore, an object of my invention to improve upon the aforesaid process for producing petroleum plastics or pale binders.

It is a particular object of my invention to produce pale binders of improved quality as to color and stability to light and weathering.

Another object of my invention resides in providing a process for producing pale binders whereby increased yields of the pale binder may be had and yet adapted to produce pale binders having superior characteristics as to color and stability against light and weathering and also having a higher melting point than pale binders heretofore produced.

Stated briefly, my invention relates to a process for producing pale binders or petroleum plastics which comprises first producing a crude pale binder and then treating the crude pale binder with acid in a plurality of stages employing acid of increasing strength in the successive stages of acid treatment. The invention includes the extraction of a crude pale binder from cracked residuum pitches and the like by means of a solvent capable of dissolving the aromatic and resinous constituents of the pitch but not the asphaltic, carbonaceous and coke-like materials and subsequently treating the crude pale binder with acid in a plurality of stages as aforesaid. One of the particular features of the invention comprises the treatment of the crude pale binder with acid in the presence of a solvent.

More particularly stated, my invention comprises a process for producing pale binders in which a crude pale binder is first extracted with a solvent, such as naphtha, from a cracked residuum pitch and then the crude pale binder is treated, either in the presence of the same solvent or a different solvent, in a plurality of treating stages with sulphuric acid of increasing strengths, as for example, in the first stage with acid of 40 to 70%, in the second stage with acid of 80 to 90% and in the third stage with acid of 98 to 100% strength, or the acid treatment may be carried out in two stages, employing 40 to 70% acid in the first stage and 80 to 100% acid in the second stage. The invention also includes the treatment with acid in decreasing amounts as the strength of the acid is increased in the successive stages of treatment.

I have discovered that crude pale binders contain very reactive bodies or constituents as well as secondary reactive bodies which darken the color of the pale binder considerably and which are highly unstable to light and weathering. These reactive bodies comprise olefinic and unsaturated hydrocarbons which are highly colored bodies and thus impart a dark color to the pale binder. When reacting the crude pale binder with concentrated sulphuric acid of 98% strength for the purpose of removing the reactive bodies and highly colored materials present in the binder, a considerable portion of the valuable materials desirable in the finished products are lost as acid sludge. The concentrated acid appears not only to polymerize the highly reactive bodies and the secondary or less reactive bodies but also appears to catalyze or induce polymerization of the valuable constituents of the material to form colored bodies. In other words, the use of concentrated acid appears to deteriorate the final product. In some instances, it is highly impracticable to remove all of the sludge from the pale binder formed by the reaction with the strong acid.

However, one of the main disadvantages in treating the crude pale binder with concentrated sulphuric acid resides in the production of a finished product which has a very much lower melting point for an equivalent color than is produced by the process forming the subject of my invention. It is advantageous, if not extremely important, that pale binders have as high a melting point as possible and yet be substantially colorless. When treating the pale binder with, say 98% sulphuric acid, a large portion of valuable and stable high molecular weight material is lost as acid sludge, thus resulting in a finished product of lower molecular weight than if the high molecular weight product were retained in the finished product.

I have discovered that when the crude pale binder is first treated with weak or dilute sulphuric acid and then with acid of increasing strength until the final treatment is effected with concentrated sulphuric acid of, say 98% strength, that a superior product and better results may be had. The treated pale binder will not only have a light color and be stable to light and weathering but will also have a higher melting point than pale binders heretofore produced such as by treating a crude pale binder directly with concentrated sulphuric acid. This treatment may be carried out in a plurality of stages employing sulphuric acid of 40 to 70% strength in the first stage of treatment and then acids of increasing strength in the successive stages. The treatment in the final stage may then be carried out with concentrated or 98% sulphuric acid without causing deterioration or loss of the valuable constituents present in the pale binder. The sulphuric acid sludge formed in each stage is separated from the treated material prior to a subsequent treatment with sulphuric acid of higher strength. When treating the crude pale binder with first a weak acid, the higher reactive constituents of the material are removed without polymerization, impairment or attack by acid of the less unsaturated and highly colored bodies and also the valuable constituents in the material. The less unsaturated and highly colored bodies may then be removed in a second stage or stages with acid of higher strength. In other words, I propose to remove from the crude pale binder, those highly reactive constituents present in the crude pale binder by means of dilute sulphuric acid which will not attack or polymerize the less unsaturated and also the valuable constituents of the crude pale binder. The less unsaturated constituents may then be removed with more concentrated acid without effecting polymerization of the valuable constituents.

The crude pale binder is preferably produced from asphaltic residues, particularly cracked residues such as those resulting from the cracking of kerosene, gas oil and other cracking stocks in the production of cracked gasoline, although it may be produced by cracking petroleum residues or heavy oils to reduce their viscosity. In general, the crude pale binder is preferably produced from a stock having a sufficient content of resinous and aromatic constituents. The stock is then steam distilled, preferably under vacuum, to remove a considerable proportion of oily fractions and to leave a high melting pitch as a distillation bottom.

The pitch or cracked residuum pitch may then be mixed with a suitable solvent capable of separating as undissolved fractions the asphaltic, carbonaceous and coke-like materials which are present in the cracked residuum pitch. As solvents capable of dissolving the resinous and valuable pale binder constituents from the asphaltic, carbonaceous and coke-like materials, I may employ naphtha, gasoline, kerosene, alcohols, such as butyl alcohol, ketones, such as acetone, esters, such as methyl formate. The dissolved fraction comprises a crude pale binder dissolved in the solvent which may be separated from the solvent by distillation.

The crude pale binder is then dissolved in another solvent such as toluene or other highly aromatic solvents or it may be retained in the original solvent, such as those above mentioned, employed to separate the crude pale binder from the cracked residuum pitch. The solution is then acid treated in a plurality of stages employing sulphuric acid of increasing strengths in the successive stages; for example, in the first stage I may treat the solution with approximately 20 to 50 lbs. per barrel of the crude pale binder of 40 to 70% sulphuric acid. The treatment with the weak sulphuric acid effects removal of the highly reactive bodies present in the crude pale binder These constituents are removed in the acid sludge. The solvent layer is then treated with a stronger acid of approximately 80 to 90% in an amount of approximately 15 to 50 lbs. per barrel of the crude pale binder. This treatment effects removal of the less unsaturated and highly colored bodies from the pale binder. After the acid sludge is separated, the solvent layer is given a final treatment with 98 to 100% sulphuric acid in an amount of 10 to 50 lbs. per barrel of the crude pale binder. This final treatment effects removal of the least reactive bodies to produce the refined pale binder. The acid treated pale binder may then be treated with clay or fuller's earth to remove traces of sulphuric acid and other acid bodies. This treatment is preferably effected while the plastic material is dissolved in the solvent and preferably is accomplished by percolating the solvent solution through fuller's earth at a temperature of approximately 200° F. although it may be mixed with the clay and then filtered. The treated solvent solution is then subjected to steam topping to remove the solvent and thus leave a refined pale binder which is stable to light and weathering and having a light green color. The pale binder will have a melting point of, say, approximately 130 to 150° F., which is higher than a pale binder produced by directly treating the crude pale binder in one stage with concentrated sulphuric acid of approximately 98% strength, this, of course, being based upon the respective treatments on crude pale binders of the same quality and characteristics.

The following is a specific example of a method for carrying out my invention to produce a pale binder. However, it is to be understood that this example is merely illustrative of one embodiment of the invention and is not to be construed as limiting my invention:

A cracked residue obtained from cracking a gas oil fraction distilled from a San Joaquin Valley crude to produce cracked gasoline and containing considerable quantities of aromatic and resinous materials was steam topped to distill approximately 50% of the lighter oils present in the cracked residue. The bottoms comprised a cracked residuum pitch having a melting point of approximately 250° F.

The cracked residuum pitch was then mixed with about six parts by weight to one of the pitch of 57° A. P. I. gravity naphtha having a boiling range of approximately 200 to 300° F. This fraction is commonly known as "cleaners' naphtha". The naphtha dissolved the oil fractions of the pitch, i. e., a crude pale binder, leaving undissolved asphaltic, carbonaceous and coke-like materials produced by the cracking operation.

The dissolved portion of the cracked residuum pitch in naphtha was decanted from the undissolved portion and was then steam topped to remove the naphtha and thus leave a crude pale binder as a distillation bottom. This material comprised approximately 54% by weight of the original high melting point steam topped cracked residuum pitch and had a melting point of about 156° F. It had a light brown color but was highly unstable to light and weathering.

The crude pale binder was redissolved in approximately five volumes of toluene to one of the binder and was treated at a temperature of 85 to 100° F. with 50 lbs. per barrel of 66% sulphuric acid based on the undissolved crude pale binder. This reaction removed substantially all of the highly reactive bodies as sludge which were separated from the solvent layer. The latter was then treated with another 50 lbs. per barrel of 86% sulphuric acid based on the original undissolved crude pale binder which caused the removal of further quantities of reactive bodies present in the binder in the sulphuric acid sludge. The solvent layer was removed from the acid sludge and was given a final treatment with sulphuric acid of 98% strength in an amount approximating 50 lbs. per barrel based on the pale crude binder which effected further removal of the less reactive bodies as acid sludge.

While I have disclosed the treatment of the crude pale binder with approximately equal quantities, i. e. 50 lbs. per barrel of sulphuric acid, it is preferable to gradually decrease the quantity of acid employed per barrel of the pale binder as the strength of the acid is increased. In other words, the removal of reactive constituents with weak acid will permit the use of smaller quantities of the stronger acids in the subsequent treatments. For example, I may treat the crude pale binder first with 40 or 50 lbs. per barrel of 66% acid, then with 25 lbs. per barrel of 86% acid and finally with 10 lbs. per barrel of 98% acid.

The solvent layer or acid treated pale binder dissolved in a solvent was then decanted from the acid sludge and percolated through fuller's earth at a temperature of 200° F. to remove the last traces of sulphuric acid and acid sludge and also to neutralize organic acidity. The treated binder in solution was then steam topped to remove the toluene leaving a refined pale binder as a distillation bottom comprising 50% by weight based on the crude pale binder. In other words, the treatment with sulphuric acid in the various stages effected removal of approximately 50% of the material as sulphuric acid sludge. This amount may be decreased by employing smaller quantities of acids in the various stages as aforesaid. The refined material had a melting point of approximately 127° F., a penetration of about 18 at 77° F. and a ductility of greater than 100 at 77° F. The pale binder had a light green color and was transparent in films $\frac{1}{16}$ in. thick when viewed by transmitted light. It was stable to light and weathering.

Instead of removing the naphtha from the crude pale binder and then mixing the latter with another solvent such as toluene, I may perform the acid treatment in the presence of the naphtha employed for extracting the crude pale binder from the cracked residuum pitch.

It will be observed that for determining the melting point, penetration and ductility of the pale binder, the following methods outlined by the American Society of Testing Materials were used:

Melting point _____ D— 36—26
Penetration _____ D— 5—25
Ductility _____ D—113—26T It is to be understood that the above description of my invention is merely illustrative of preferred embodiments of my invention of which many variations within the scope of the following claims may be made by those skilled in the art without departing from the spirit thereof.

I claim:

1. A process for producing petroleum plastics from pitches containing the same which comprises separating a crude petroleum plastic from said pitch by means of a solvent, treating said crude petroleum plastic in said solvent with sulfuric acid in a plurality of stages employing sulfuric acid of 40 to 70% strength in the first of said stages and sulfuric acid of materially greater strength in the second of said stages and subsequently separating the solvent from said acid treated solution.

2. A process as in claim 1 in which the solvent employed during the acid treating steps comprises an aromatic solvent.

3. A process for producing petroleum plastics from asphaltic residues containing resinous materials which comprises distilling an asphaltic residue to separate oily fractions and to leave a high melting point pitch containing said resinous materials as a distillation bottom, mixing said pitch with a solvent capable of dissolving said resinous materials from said pitch but to leave carbonaceous and coke-like materials as undissolved materials, treating said solvent solution of resinous materials with sulphuric acid of increasing strength in a plurality of stages employing sulphuric acid of 40 to 70% strength in the first stage and subsequently separating said solvent from said acid treated resinous materials.

4. A process for producing petroleum plastics from asphaltic residues containing resinous materials which comprises distilling an asphaltic residue to separate oily fractions and to leave a high melting point pitch containing said resinous materials as a distillation bottom, extracting said resinous materials from said pitch by means of a solvent, treating said solvent solution of resinous materials with sulphuric acid of increasing strength in a plurality of stages employing sulfuric acid of 40 to 70% strength in the first stage and subsequently separating said solvent from said acid treated resinous materials.

5. A process for producing petroleum plastics from pitches containing the same which comprises separating a crude petroleum plastic from said pitch by means of a solvent, treating said crude petroleum plastic in said solvent with sulphuric acid in a plurality of stages employing sulphuric acid of 40 to 70% strength in the first of said stages and sulphuric acid of materially greater strength in the second of said stages, treating said acid treated solution with clay and subsequently separating the solvent from said acid and clay treated solution.

6. A process for producing petroleum plastics from pitches containing the same which comprises separating a crude petroleum plastic from said pitch by means of a solvent, treating said crude petroleum plastic in said solvent with sulphuric acid of 40 to 70% strength in a first stage, treating said acid treated solution with sulphuric acid of 80% strength or greater in a subsequent stage, treating said acid treated solution with clay and subsequently separating the solvent from said acid and clay treated solution.

7. A process as in claim 6 in which the solvent is an aromatic hydrocarbon.

8. A process for producing petroleum plastics from petroleum pitches containing the same which comprises separating a crude petroleum plastic from said petroleum pitch by means of an aromatic hydrocarbon solvent, treating said crude petroleum plastic in said solvent with sulphuric acid of 40 to 70% strength in one stage, treating said acid treated solution with sulphuric acid of 80% strength or greater in a subsequent stage and subsequently separating said solvent from said acid treated petroleum plastic.

9. A process for producing petroleum plastics from asphaltic fractions containing resinous materials which comprises mixing said asphaltic fraction with a solvent capable of dissolving said resinous materials from said asphaltic fractions but to leave carbonaceous and coke-like materials as undissolved materials, separating the latter from the solvent solution of resinous materials, removing said solvent from the resinous materials, redissolving said resinous materials in an aromatic hydrocarbon solvent and subsequently treating said resinous materials dissolved in said aromatic hydrocarbon solvent with acid of materially increasing strength in a plurality of stages, said acid comprising a strong mineral acid having a polymerizing action and subsequently separating said solvent from said acid treated resinous materials.

DONALD E. CARR.